UNITED STATES PATENT OFFICE.

LUDWIG TAUB AND GEORG FICKEWIRTH, OF ELBERFELD, GERMANY, ASSIGNORS TO FARBENFABRIKEN VORM. FRIEDR. BAYER & CO., OF ELBERFELD, GERMANY, A CORPORATION OF GERMANY.

SUBSTANCE ISOLATED FROM THE APOCYNACEÆ AND PROCESS OF PRODUCING THE SAME.

1,113,714. Specification of Letters Patent. Patented Oct. 13, 1914.

No Drawing. Application filed September 4, 1912. Serial No. 718,497.

*To all whom it may concern:*

Be it known that we, LUDWIG TAUB and GEORG FICKEWIRTH, citizens of the German Empire, residing at Elberfeld, Germany, have invented new and useful Improvements in Substances Isolated from the *Apocynaceæ* and Processes of Producing the Same, of which the following is a specification.

Fluid extracts made from Canadian hemp (*Apocynum cannabinum*) have been extensively used as cardiacs and diuretics, and many attempts to prepare from these extracts the active principle have heretofore been made. Amorphous and resinous products, such as apocynin and apocynsin, representing mixtures, and decomposition products of uncertain composition, have been prepared, also crystalline products, such as apocynin; but none of these preparations act like the drug, apocynin (acetovanillon) in a pure state being even almost without effect.

A crystalline product of m. p. 170° to 175° and to which the name apocynamarin has been given has also been prepared which, from its action on certain animals, was thought to represent the real active principle (Moore, *Trans. Chem. Soc.* 1909, I, p. 734). But its action upon human beings has been found to differ distinctly from that of the fluid extracts of the drug and the product like all the others probably represents a product of conversion of the real principle, the formation of which is due to the method of isolation used.

The present invention relates to the preparation of a new physiologically active product, differing from any heretofore known, and also differing from the drug. It possesses the same valuable properties as the fluid extracts heretofore used as a diuretic and cardiac tonic, and offers the advantage over them of exact dosage and subcutaneous injection, but it differs from the drug inasmuch as it does not act as an expectorant and diaphoretic in malaria and pneumonia and is not effective as a remedy in jaundice. In the process of its preparation the isolation is carried out under conditions which prevent the conversion of this new substance into such products as were heretofore produced. As a result a uniform product, crystallizable from methyl alcohol in the form of colorless shiny prisms is obtained.

The process of the present invention comprises making an extract of the weed, in removing from this extract resinous constituents and in purifying the resulting extract and isolating the desired product without subjecting the material during any stage of the treatment to too high temperature or to prolonged treatment with boiling water and steam. If the extract is strongly acid it is advantageously neutralized early in the process.

The preparation of the novel product of the present invention is further illustrated by the following example: 1000 parts of comminuted rhizome of the *Apocynum cannabinum* or *androsæmifolium* are extracted with boiling carbon tetrachlorid until the extracted product loses its intensely bitter taste. The light yellow extract resulting is concentrated at reduced pressure. The syrupy residue is taken up with 1000 parts of alcohol and is treated with water until no more resin separates and the resin thus separated is removed by filtration. To the filtrate is added a solution of basic lead acetate and the precipitate formed is in turn filtered off, and the excess of lead in solution precipitated from the filtrate by hydrogen sulfid and filtered off. The lead-free filtrate is concentrated *in vacuo* to 100 parts and the resulting residue is extracted in chloroform in which the new substance is easily soluble. The chloroform solution, after having been dried over sodium sulfate, is treated with ether, whereupon the impurities are precipitated and thus removed. On addition of petroleum ether or ligroin the new substance is now separated in the form of a colorless amorphous precipitate which is crystallized from methyl alcohol. The substance thus obtained crystallizes from organic solvents in colorless shiny prisms of exceedingly bitter taste which begin to become liquid at about 130° and which melt at 135 to 140° to a clear liquid. The novel product thus obtained is difficultly soluble in cold water and ligroin, but more easily soluble in hot water and in most other organic solvents. Instead of using the root as in the above example, other parts of the plant, such as the bark, can be used. And instead of the *Apocynum cannabinum* other *Apocynaceæ* can be employed, e. g. *Apocynum androsæmifolium*, *Apocynum venetum*, etc. Instead of carbon tetrachlorid in the above example, other solvents could be employed, e. g. benzol, chloroform, dichlorethylene. With these solvents the comminuted product is percolated either warm or cold, or extracted at boiling temperature, care being taken that water is excluded from contact with the extracts which are reacting still acid.

The novel product of the present invention is also obtainable from the commercial fluid extracts by treatment with such organic solvents as carbon tetrachlorid which permit the separation of the new substance from the sugar of the extract. The fluid extracts are advantageously previously treated with inert substances, for example, sand, kieselguhr, sawdust, anhydrous sodium sulfate. The new product can also be separated from the resinous constituents of the extract containing it, and from amorphous products heretofore produced containing it, by fractional extraction with such solvents as ether in which the new substance and the impurities have different solubilities:

We claim:—

1. A physiologically active product which crystallizes from methyl alcohol in colorless shiny prisms of exceedingly bitter taste which begin to become liquid at about 130° and which melt at 135 to 140° to a clear liquid, insoluble in ligroin, difficultly soluble in cold water and more easily soluble in hot water, and possessing the valuable diuretic and cardiactonic properties of the apocynum.

2. The process of isolating a physiologically active product from the *Apocynaceæ*, which comprises forming an extract of such *Apocynaceæ*, concentrating the thus obtained extract to a syrupy consistency, treating the same with alcohol, diluting the alcoholic solution with water, filtering the same and adding to the filtrate acetate of lead, removing the excess of lead by means of sulfureted hydrogen, concentrating the liquid, extracting the same with chloroform, precipitating the new substance from this extract and finally recrystallizing the same from methylic alcohol, the temperature being maintained throughout the process below that at which the decomposition of the new active substance takes place.

3. The process of isolating a physiologically active product from the *Apocynaceæ*, which comprises extracting such *Apocynaceæ* with tetrachlorid of carbon, concentrating the thus obtained extract to a syrupy consistency, treating the same with alcohol, diluting the alcoholic solution with water, filtering the same and adding to the filtrate acetate of lead, removing the excess of lead by means of sulfureted hydrogen, concentrating the liquid, extracting the same with chloroform, precipitating the new substance from this extract, and finally recrystallizing the same from methylic alcohol, the temperature being maintained throughout the process below that at which the decomposition of the new active substance takes place.

In testimony whereof we have hereunto set our hands in the presence of two subscribing witnesses.

LUDWIG TAUB. [L. S.]
GEORG FICKEWIRTH. [L. S.]

Witnesses:
HELEN NUFER,
ALBERT NUFER.